US010570782B2

(12) United States Patent
Lintl et al.

(10) Patent No.: US 10,570,782 B2
(45) Date of Patent: Feb. 25, 2020

(54) ORC STACK-SYSTEM CONTROL

(71) Applicant: ORCAN ENERGY AG, München (DE)

(72) Inventors: Markus Lintl, München (DE); Jens-Patrick Springer, München (DE); Andreas Schuster, Tussenhausen (DE)

(73) Assignee: Orcan Energy AG, München (DE)

( * ) Notice: Subject to any disclaimer, the term of this patent is extended or adjusted under 35 U.S.C. 154(b) by 218 days.

(21) Appl. No.: 15/125,106

(22) PCT Filed: Mar. 3, 2015

(86) PCT No.: PCT/EP2015/054392
§ 371 (c)(1),
(2) Date: Sep. 9, 2016

(87) PCT Pub. No.: WO2015/135796
PCT Pub. Date: Sep. 17, 2015

(65) Prior Publication Data
US 2016/0376932 A1   Dec. 29, 2016

(30) Foreign Application Priority Data

Mar. 12, 2014   (EP) ..................................... 14159191

(51) Int. Cl.
*F01K 13/02* (2006.01)
*F01K 25/08* (2006.01)
(Continued)

(52) U.S. Cl.
CPC .............. *F01K 13/02* (2013.01); *F01K 23/00* (2013.01); *F01K 25/08* (2013.01); *F22B 33/02* (2013.01)

(58) Field of Classification Search
CPC .......... F01K 23/00; F01K 23/02; F01K 23/04; F01K 23/08
(Continued)

(56) References Cited

U.S. PATENT DOCUMENTS 5,857,338 A    1/1999  Rigal
5,860,279 A    1/1999  Bronicki et al.
(Continued)

FOREIGN PATENT DOCUMENTS

DE    19748315 A1    5/1998
EP      372864 A1    6/1990
(Continued)

OTHER PUBLICATIONS

European Search Report for EP 14159191.7 dated Nov. 13, 2014.
(Continued)

*Primary Examiner* — Laert Dounis
(74) *Attorney, Agent, or Firm* — Moore & Van Allen PLLC; Henry B. Ward, III

(57) ABSTRACT

The invention relates to a method for controlling ORC stacks with a total number $n_{tot}$ of individually operable ORC modules, said method comprising the following steps: determining the running time remaining until the next servicing time for each operable ORC module respectively; determining a target number $n_{soll}$ of ORC modules to be operated; comparing said target number $n_{soll}$ to an actual number $n_{ist}$ of currently operated ORC modules; when $n_{soll} > n_{ist}$, connecting a number $n_{soll} - n_{ist}$ of ORC modules that corresponds to the difference between the target number and the actual number, where the ORC modules with the longest remaining running times of the ORC modules currently not being operated are connected; and/or when $n_{soll} < n_{ist}$, disconnecting a number $n_{ist} - n_{soll}$ of ORC modules that corresponds to the difference between the actual number and the target number, where the ORC modules with the shortest remaining running times of the ORC modules currently being operated are disconnected; and/or when $n_{soll} = n_{ist}$, connecting the ORC module with the longest remaining running time $\Delta t_1$ of the ORC modules not currently being operated, and disconnecting the ORC module with the
(Continued)

Figure 2:
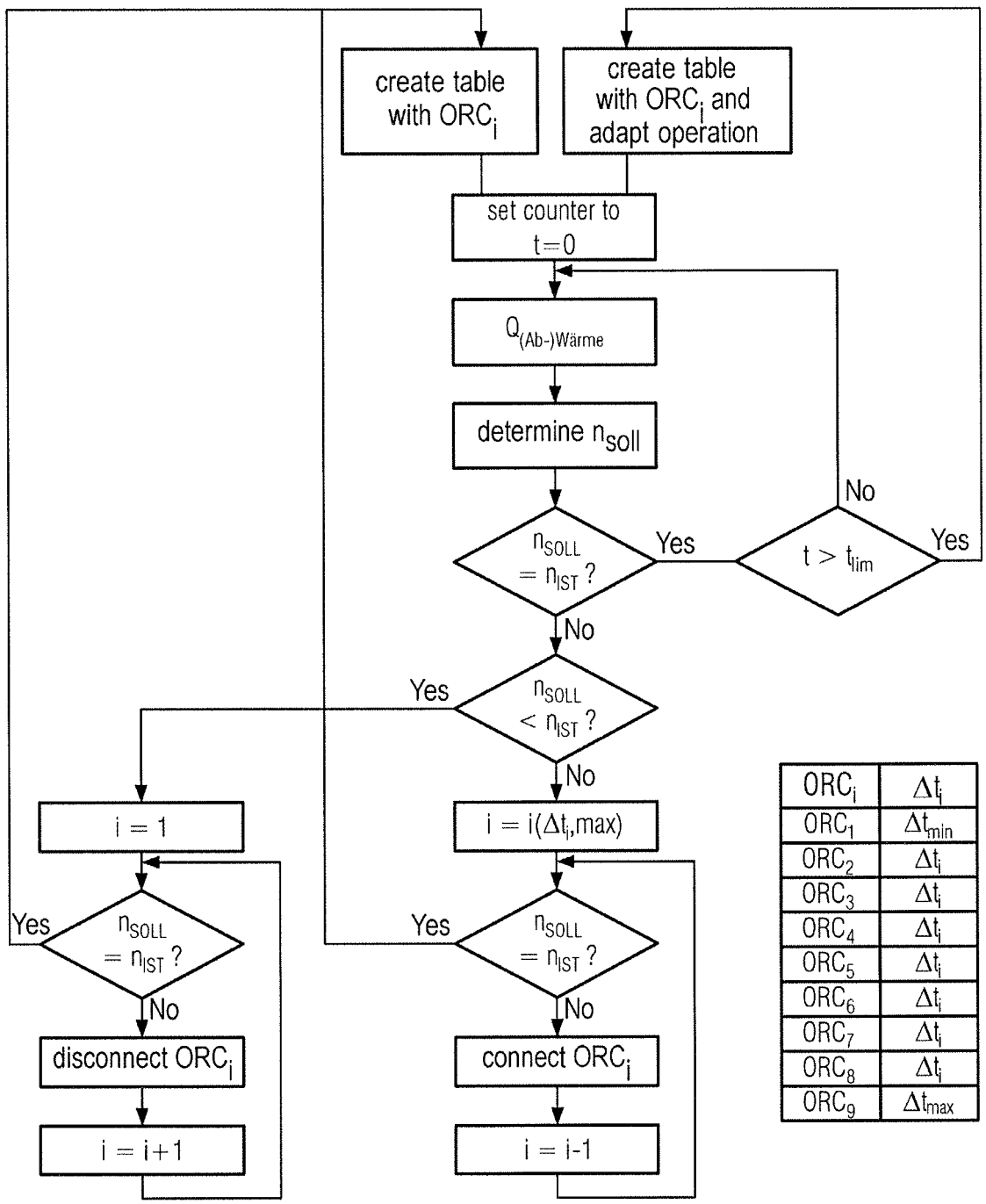

shortest remaining running time $\Delta t_2$ of the ORC modules currently being operated, if $\Delta t_1 > \Delta t_2$.

22 Claims, 4 Drawing Sheets

(51) Int. Cl.
  *F22B 33/02* (2006.01)
  *F01K 23/00* (2006.01)
(58) Field of Classification Search
  USPC .................................................. 60/646, 657
  See application file for complete search history.

(56) References Cited

U.S. PATENT DOCUMENTS

2006/0112693 A1* 6/2006 Sundel ............... F01K 15/00
   60/670
2006/0254276 A1* 11/2006 Sato ................... F01K 23/101
   60/645
2013/0168972 A1* 7/2013 Xu ...................... F01K 23/04
   290/1 R
2015/0330259 A1* 11/2015 Kobayashi .......... F01K 13/02
   60/645

FOREIGN PATENT DOCUMENTS

JP    2006313049 A * 11/2006
JP    2008175108 A *  7/2008

OTHER PUBLICATIONS

English translation of International Search Report for International Patent Application No. PCT/EP2015/054392 dated Aug. 4, 2015.

* cited by examiner

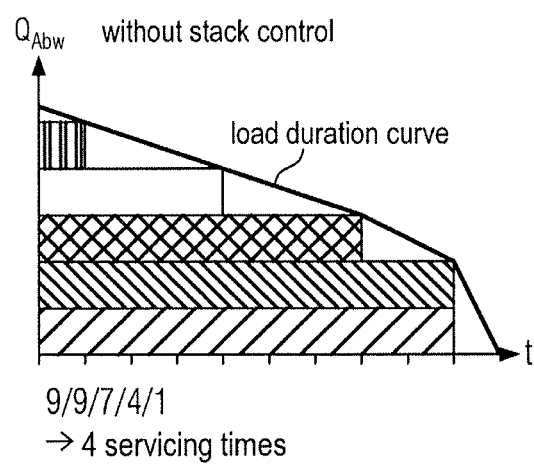
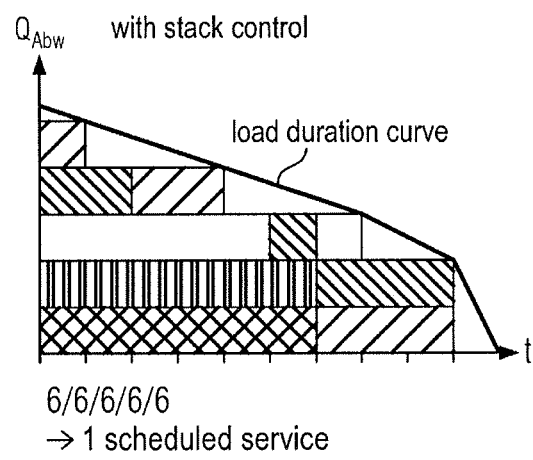
FIG. 1A
FIG. 1B

ORC STACK-SYSTEM CONTROL

FIELD OF THE INVENTION

The invention relates to a method for controlling an ORC system having a total number $n_{tot}$ of individually operable ORC modules.

PRIOR ART

A system for generating electrical energy from thermal energy using the Organic Rankine Cycle as a thermodynamic cycle (ORC system) is composed of the following main components: a feed pump that delivers liquid organic working medium subject to pressure increase to an evaporator, the evaporator itself in which the working medium is evaporated subject to the supply of heat and optionally additionally superheated, an expansion engine in which the high pressure vapor is expanded, thereby producing mechanical energy which is via a generator converted into electrical energy, and a condenser in which the low-pressure vapor from the expansion engine is liquefied. The liquid working medium from the condenser via an optional storage container (feed tank) and a suction line again reaches the feed pump of the system, whereby the thermodynamic cycle is closed.

An operational ORC system in a compact design is also known as an ORC module. In order to manage larger amounts of waste heat beyond the design range of an ORC module, several modules are connected together. This arrangement is hereinafter referred to as an ORC stack. Several ORC modules are there operated in parallel, where their number is selected depending on the waste heat output.

An ORC module can be operated without permanent operating staff. Only a few components require servicing from time to time. The types of service can be divided into calendar-based types of service (e.g. leakage test, at least annually), operating hour-based types of service (e.g. fan on the frequency converter as it runs as soon as the module is in operation), full load operating hour-based types of service (e.g. fan on the condenser whose operation is load dependent), condition-based types of service (e.g. fouled heat exchangers such as waste gas heat exchanger or condenser).

In uncoordinated operation of the individual ORC modules of an ORC stack, different service intervals arise for the individual ORC modules (see FIG. 1A). This is disadvantageous because servicing involves the interruption of operations and servicing personnel must respectively travel there. It is also disadvantageous if different services are due within an ORC module in an uncoordinated manner.

DESCRIPTION OF THE INVENTION

The object of the invention is to overcome—at least in part—the disadvantages described above.

This object is satisfied by a method according to claim 1.

A method for controlling an ORC stack with a total number $n_{tot}$ of individually operable ORC modules is according to the invention provided, where the method comprises the steps of: determining the respective running time remaining until the next servicing time for each operable ORC module; determining a target number $n_{soll}$ of ORC modules to be operated; comparing said target number $n_{soll}$ to an actual number $n_{ist}$ of currently operated ORC modules; when $n_{soll} > n_{ist}$, connecting a number $n_{soll} - n_{ist}$ of ORC modules that corresponds to the difference between the target number and the actual number, where the ORC modules with the longest remaining running times of ORC modules currently not being operated are connected; and/or when $n_{soll} < n_{ist}$, disconnecting a number $n_{ist} - n_{soll}$ of ORC modules that corresponds to the difference between the actual number and the target number, where the ORC modules with the shortest remaining running times of ORC modules currently being operated are disconnected; and/or when $n_{soll} = n_{ist}$, connecting the ORC module with the longest remaining running time $\Delta t_1$ of ORC modules not currently being operated, and disconnecting the ORC module with the shortest remaining running time $\Delta t_2$ of ORC modules currently being operated, when $\Delta t_1 > \Delta t_2$.

With the method according to the invention, the operating hours of the individual ORC modules are homogenized among each other. For example, if a module needs to be connected, then the one module is connected from the group of modules currently not being operated which has the longest running time remaining until the next servicing. On the other hand, if a module must be disconnected, then the one module is disconnected from the group of currently operated modules which has the shortest running term remaining until the next servicing. If due to the number no module must be connected or disconnected, then additionally or optionally an examination of the running times remaining until the next servicing is nevertheless performed. If it is determined that an operated module has a shorter remaining running time than a module not being operated, then the former is disconnected and the latter is connected. Less operated modules are thereby in each case increasingly used and modules previously used more are then used less. It is in this way achieved that servicing times coincide or at least almost coincide, so that the necessary servicing work for the ORC modules can be performed during one scheduled servicing time. Connecting and disconnecting of course only occurs for an integer number of ORC modules. The homogenization can optionally also be performed for the individual ORC modules to make different services coincide.

The method according to the invention can be developed to the effect that re-performing the steps of the method according to the invention is done after a predetermined update period. This has the advantage that with longer operation of the ORC stack under constant conditions, for example, at a constant heat flow from a heat source, updated remaining running times are determined, on the basis of which the modules respectively used are selected.

Another development is that determining the running time remaining until the next servicing can for each operable ORC module comprise determining the shortest running time from a plurality of running times remaining until the servicing times for various services for the respective ORC module. Various services, e.g. for various components are typically to be performed for each module. According to this development, the decision regarding connecting or disconnecting modules is taken based on the shortest of all running times remaining for the respective module.

Alternatively, the respective servicing times for the operable ORC modules can be servicing times for similar services. Homogenization of the remaining running times can in this manner be obtained for a particular type of service. Service work, for example, that requires a specialist to perform it, can be scheduled for one scheduled service.

According to another embodiment, determining the remaining running time or remaining running times, respectively, can be done using predetermined or self-learning functions/algorithms. Such functions or algorithms stored, for example, in a control unit can be determined empirically or they are entered as defaults, as is the case for statutory inspection intervals.

The method can further comprise the step of: determining a variable that determines a heat flow in the ORC stack, in particular the heat flow itself or the mass flow of a heat-conveying fluid; where determining the target number of ORC modules to be operated is done in dependence of the variable that determines the heat flow. The heat flow from a heat source can be measured or otherwise determined (for example, calculated from other variables measured), and then the number of required ORC modules for receiving the heat flow and for generating electric energy can be determined.

In the event that a non-integer number of ORC modules would due to the heat flow for exact utilization of the heat supply be connected or disconnected, determining the target number can include rounding up or down to the next higher or next lower integer number. This can made to depend, for example, on whether delivery of the heat flow from the heat source must be taken (e.g. in the case of the ORC stack cooling the heat source by taking delivery of the heat generated) or not (e.g. where heat generated can be dissipated elsewhere, in particular by delivering it to the ambient air).

According to a further development, the above-mentioned method comprises the further step of: re-determining the input heat flow, in particular after a predetermined waiting period after last determining the input heat flow has lapsed, and if a change of the input heat flow is determined, in particular beyond a tolerance range for the change, re-performing the method. In this manner, all method steps are with a change of the heat flow from the heat source repeatedly performed so that the number of modules is newly determined and also which modules are to be operated. Determining the target number of ORC modules to be operated can further comprise determining a respective heat flow to be supplied within an operating range for each ORC module with respect to the heat flow supplied. Each module must not necessarily be operated at its rated power, but it has an operating range for the incoming heat flow.

The operating range can there be defined for each ORC module by a heat flow range in an output curve or an efficiency curve indicating the relationship between electric power and electric efficiency in dependence of the heat flow supplied, in particular a heat flow range being defined by a minimum and a maximum heat flow.

The respective heat flow to be supplied can in particular be determined for one or more ORC modules to be operated such that the largest possible electrical line [sic] or the highest possible electrical efficiency results. This results in an optimal conversion of the introduced heat into electrical energy. Determining the heat flow to be supplied can there for each ORC module comprise maximizing overall electrical efficiency of the ORC stack.

According to one development, determining the heat flow supplied can be effected within the operating range while taking into account the changes of the remaining running times resulting therefrom. Therefore, further adjustment options are available for aligning servicing times.

The heat flow to be supplied can be determined such that a shift of a servicing time by a desired period results, resulting in particular in shortening or lengthening the respective remaining running time. For example, a module with a very short running time remaining until the next service of the condenser fan can despite operation be used less in that the heat flow supplied to this module is selected at the lower end of the operating range.

The invention also provides a computer program product comprising program elements that are suitable for performing the method according to the invention or one of the developments when loaded into a computer.

The invention further provides an ORC stack with a total number $n_{tot}$ of individually operable ORC modules, where the ORC stack comprises a control unit for performing the method according to the invention or one of the developments.

The developments mentioned can be used individually or as claimed suitably in combination with each other.

Further features and exemplary embodiments as well as advantages of the present invention are illustrated below using the figures. It is understood that the embodiments do not exhaust the scope of the present invention. It is further understood that some or all features described hereafter can also be combined with each other in different ways.

FIGURES

FIG. 1A,B show distributions of operating times of ORC modules in an ORC stack.

FIG. 2 shows a flow diagram for a controller according to an embodiment of the present invention.

Figure 3A:
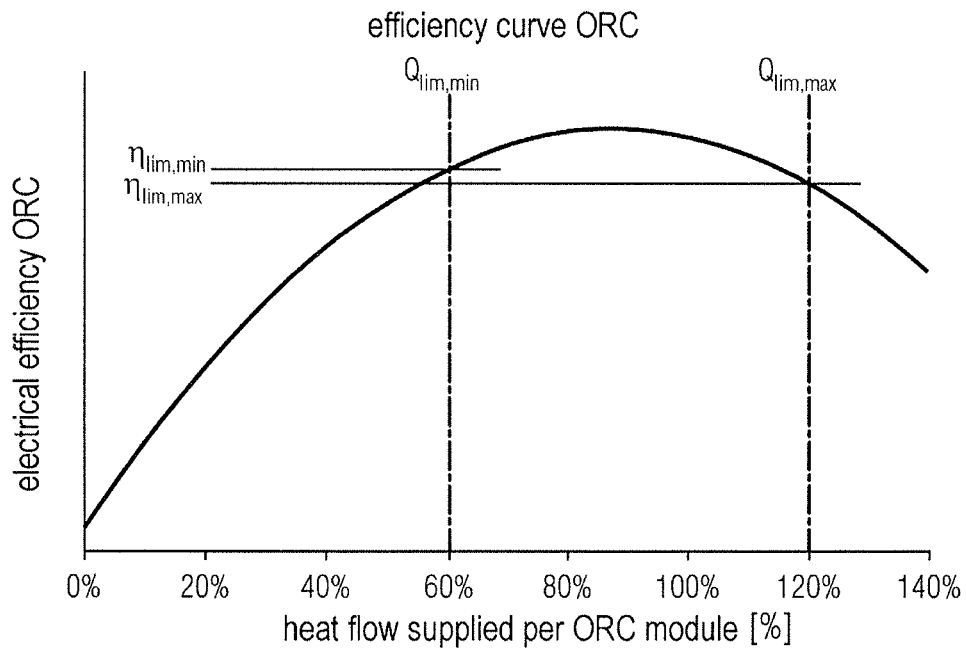

FIGS. 3A,B show the efficiency curve in dependence of the heat flow supplied.

Figure 4:
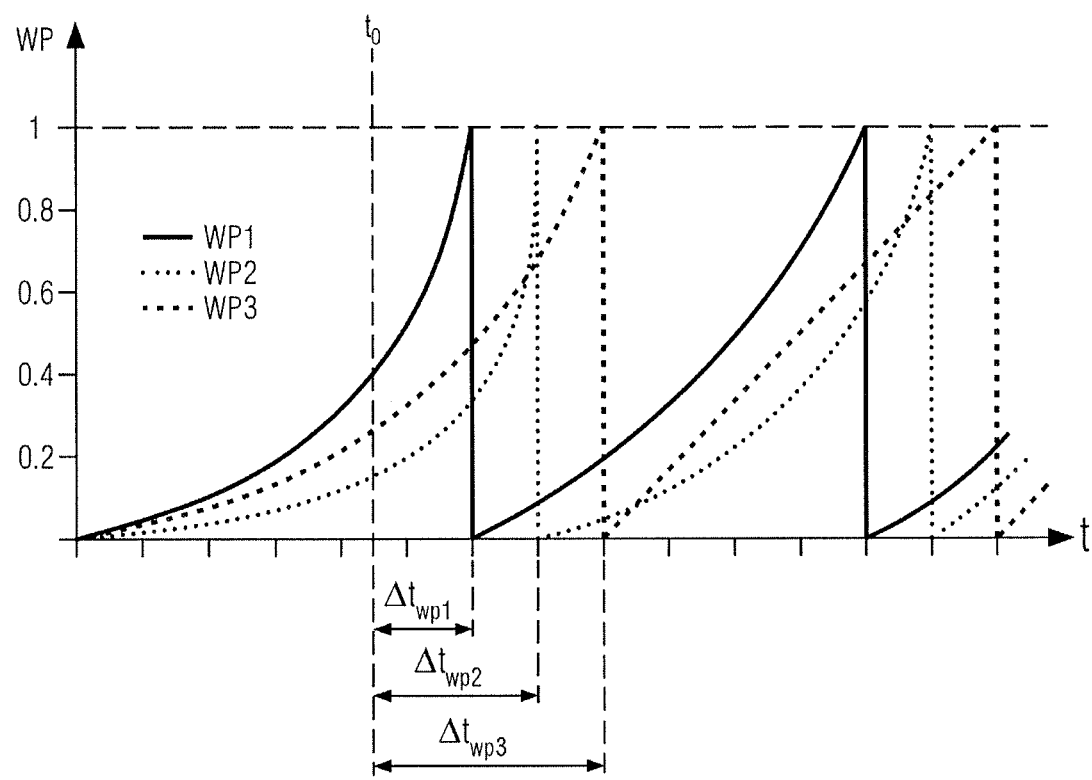

FIG. 4 shows the temporal course of service parameters.

EMBODIMENTS

Depending on the available (waste) heat output, ORC modules 1 and 2 in FIG. 1A are used for the base load and continue operation completely over the time interval specified. ORC modules 3-5, in contrast, are required only in part. This results in a highly heterogeneous distribution of operating times in accordance with the prescribed servicing intervals and servicing times. The objective, however, is homogenization of the servicing intervals and servicing times as shown in FIG. 1B. As this sketch indicates, this requires that the individual ORC modules are operated in a coordinated manner with a varying number of operating ORC modules. The fundamental question is, therefore, how process control can synchronize the servicing intervals in that it connects and disconnects the ORC modules such that the maximum number of ORC modules can be serviced during scheduled servicing. Furthermore, process control is by synchronization of the servicing intervals to ensure that no components are during servicing work replaced prior to having reached their service life, which has previously been explained by a discontinuation of otherwise necessary additional servicing work.

To record the remaining running times for different types of servicing, a respective so-called service parameter is defined in this embodiment which results in a steadily growing value in connection with the running time remaining until the next servicing. This is illustrated in FIG. 4 by way of example for three service parameters WP1, WP2 and WP3 in dependence of time t. The point in time to is a current time of observation in which a decision is made about ORC modules to be connected or disconnected. Each service parameter is there associated with a respective remaining running time $\Delta t_{WP1}$, $\Delta t_{WP2}$ and $\Delta t_{WP3}$, until the next servicing. Determining the remaining running time can be e.g. extrapolated from the recent course of the service parameter or determined by way of a self-learning logic.

Alternatively, the service parameter can vice versa also be concluded from the remaining running time. For example, a fixed linear relationship exists for annually fixed servicing between WP and $\Delta t_{WP}$. The types of services in an ORC module can be divided into service parameters (WP) as follows:

a) calendar-based WP—e.g. leakage test (at least annually)
b) operating hour-based WP—e.g. fan on the frequency converter (as it runs as soon as the ORC module is in operation)
c) full load operating hour-based WP (e.g. fan on condenser (it runs depending on the load)
d) condition-based WP (e.g. fouled heat exchangers (waste gas heat exchanger or condenser).

The service parameters are based on stored or self-learning functions/algorithms. Servicing has to be done when the service parameter is greater than or equal to 1, where ideally servicing should be done exactly at WP=1. Slight exceeding the service parameter will generally be possible, however, the system then operates outside the values specified. A service parameter establishes a relationship between the running times remaining until servicing is due, where WP=0 in the event of a service just having been performed. The service parameter therefore maps the remaining running time to the interval [0; 1], where exceeding the scheduled servicing time is associated with values WP>1. For a service parameter based purely on operating time, summation of the running time since the last service is there to be performed. With servicing independent of the operating hours (for example, annually), the service parameter increases linearly from the last service until the next service from 0 to 1.

FIG. 2 illustrates the process of decision making as to which ORC modules are to be put into operation or disconnected, respectively.

$1^{st}$ step: determining the sequence of the ORC modules to be serviced next. In this step, a table with all available, i.e. operational or currently operating ORC modules $ORC_i$ is created, sorted according to its smallest $\Delta t_i$. ORC modules which are not operational, e.g. due to a defect or due to servicing work taking place, are not included in the table. $\Delta t_i$ denotes the time interval from the current point in time until the next service to be performed which is determined by reaching value 1 for the respective service parameter WP having the greatest value. This value is determined for each WP of every ORC module (by extrapolating the graphs of the individual WP based e.g. on the curve change in the past or other values such as season, sulfur content in biogas/waste gas, etc.). With a stack of ORC modules, various service parameters can lead to servicing, e.g. the service parameter of the feed pump can in one ORC module be reached, in another one, however, it can be the service parameters of a fan, etc. The WP with the highest value is determined for every ORC module. The remaining running times $\Delta t_i$ are derived therefrom, on the basis of which a table for increasing remaining running times is then created. The service parameter can—as described above—be located in a fixed time interval due to statutory requirements, can be defined by operating or full load operating hours, or also the condition of the component. Once the table has been updated, the running variable t=0 is set.

$2^{nd}$ step: determining heat flow. Here, the heat flow $\dot{Q}_{(Ab)Wärme}$ is determined as the input parameter, this can be done determined in different ways, e.g. by direct measurement using a heat meter or indirectly by determination from parameters and model equations of the components of the ORC.

$3^{rd}$ step: determining $n_{soll}$. Based on a characteristic curve for partial load behavior of an ORC module—see line in FIG. 3A—a range (design range) depending on the heat supplied in individual ORC modules is defined (x-axis, $Q_{lim,min}$ to $Q_{lim,max}$) in which the ORC module is to be operated. The partial load behavior of an ORC module can be determined experimentally by running various performance variables, but can with sufficient knowledge of the individual components of the working medium and of the interconnection also be calculated theoretically.

The exemplary curve illustrated in FIG. 3A is an adjusted compensation function based on measured values. It is apparent that the maximum efficiency is given at a slightly lower heat output than full load (=100% heat output, rated power, design point). This is for the reason that specifically more area is available under partial load for heat transfer in the evaporator and the condenser. In particular, efficient heat dissipation with low auxiliary power requirement and a lower condensation pressure results for the condenser from this factual oversizing which leads to better gross efficiency. Both together are largely responsible for the increasing efficiency in the partial load range. The decrease in efficiency to the left of the maximum is due to the decrease of the mass flow and the fresh vapor temperature, which is reflected in worse expansion engines and poorer thermal efficiencies.

Also possible is operating the ORC in overload (based on the design point) as long as the component specifications are observed (for example, maximum rotational speed or maximum electrical output). Overload operation leads to an increase in gross output, but also results in an increase in internal consumption, which overcompensates the increase in gross output. Maximum efficiency is thus formed. The decrease in efficiency at overload operation e.g. when using an air condenser with a controlled condenser fan, results predominantly from the disproportionately increasing internal current consumption of the condenser fan.

Defining the design range can be dependent on several factors (for example, dynamics of the heat source, number of ORC modules per stack, also exterior temperature). The design range can for any application therefore be previously defined or determined by a self-learning algorithm or individually once or also continuously adapted.

Figure 3B:
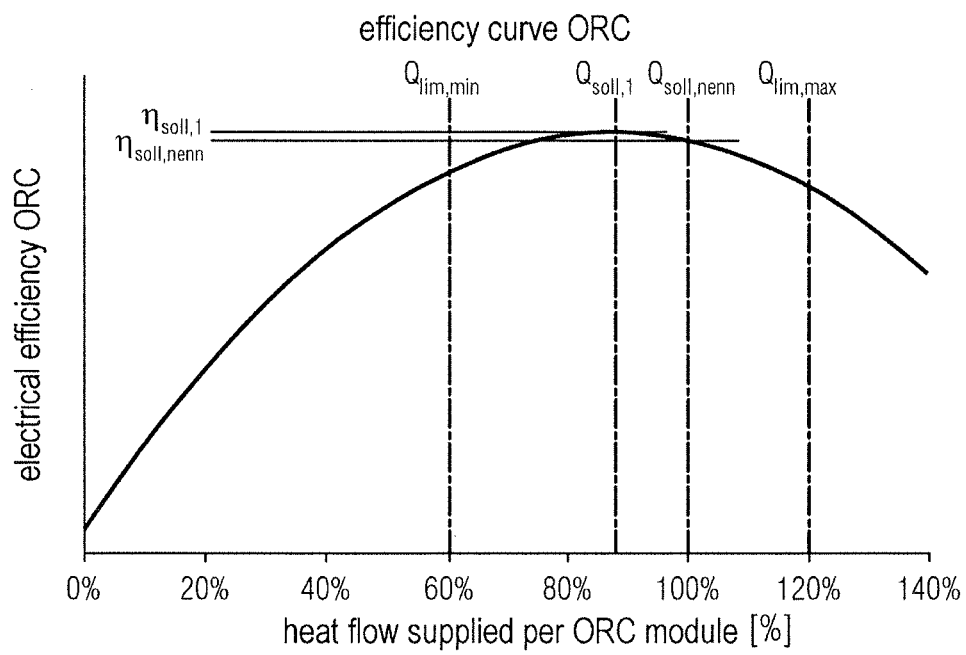

The control scheme presently presented thereby enables output-optimized operation of ORC stacks because all the individual systems can be operated at an optimized application point. FIG. 3B shows two different operating points for a constant total heat input into the stack ($\dot{Q}_{(Ab)Wärme}$). They result from a differing number of ORC modules in operation. The relationship applies for this example: $n_{soll,1} > n_{soll,nenn}$. The ORC stack process control allows for both operating cases because it is in both cases ensured that the ORC modules are operated with efficiency in the design range. As shown in FIG. 3B, higher-level stack control enables optimization of the output of the individual systems due to the fact that the efficiency of the individual systems at partial load behavior (90%=Soll, 1) is better than at the design point of the individual ORC modules (100%=Soll, nenn).

As long as the number is within the limits of the design range, this value of $n_{soll}$ is permitted by the process control. But how many ORC modules are actually in operation can beyond that depend on further factors. The efficiency advantage by one or more ORC modules additional commissioned may not be canceled or surpassed by additionally incurred servicing costs, either by depleting operating time until reaching an operating hour-base WP, a full load operating hour-based WP, or the further increase of a condition-based WP, which the control presently ensures.

$4^{th}$ step: determining the number of ORC modules running.

In this step, the controller compares the number of required ORC modules ($n_{soll}$) for optimal power generation of the available waste heat power ($\dot{Q}_{(Ab)Wärme}$) with the number of ORC modules currently in operation ($n_{ist}$).

$1^{st}$ Case: $n_{ist}=n_{soll}$

In the event that $n_{ist}=n_{soll}$ the ORC modules running remain in operation. If after a defined minimum running time $t_{lim}$ the output has not changed, then the table of service parameters is checked for its being up-to-date and respective ORC modules on connected or disconnected. It is thereby prevented that some ORC modules arrive at servicing times too quickly and are therefore no longer available. If ORC modules must be disconnected, then that ORC module with the lowest $\Delta t_i$ (table ranking 1) is first disconnected and possibly others (according to sequence in the table). If ORC modules are to be connected, then those ORC modules which are not in operation but operational having the highest $\Delta t_i$ are to be connected.

$2^{nd}$ Case: $n_{soll}<n_{ist}$.

If fewer ORC modules are to be in operation than is currently the case, then ORC modules must be disconnected. For this purpose a running variable i=1 is set. If the termination criterion $n_{ist}=n_{soll}$ is now not yet given, then ORC modules are continually disconnected, starting with the largest service parameters, i.e. with the shortest running time remaining until servicing. This is achieved by increasing the running variable i by 1.

$3^{rd}$ Case: $n_{soll}>n_{ist}$

If fewer ORC modules are to be in operation than is currently the case, then ORC modules must be connected. For this purpose a control variable $i=i(\Delta t_i=max)$ is set, i.e., that i is used which corresponds to the ORC module with the lowest service parameter. That i can—but does not necessarily need to—correspond to the number of ORC modules. As longs as the termination criterion $n_{ist}=n_{soll}$ is not yet given, then ORC modules are continually connected, starting with the lowest service parameter, i.e. with the longest running time remaining until servicing, and the running variable is reduced by 1.

The embodiments illustrated are only by way of example and the full scope of the present invention is defined by the claims.

The invention claimed is:

1. A method for controlling an Organic Rankine Cycle (ORC) stack with a total number $n_{tot}$ of individually operable ORC modules, the method comprising the steps of:
   determining the respective running time remaining until the next servicing time for each operable ORC module, wherein the respective running time remaining until the next servicing time is determined for one or more of the ORC modules based at least on a load and an operating time;
   determining a target number $n_{soll}$ of ORC modules to be operated;
   comparing said target number $n_{soll}$ to an actual number $n_{ist}$ of currently operated ORC modules;
   wherein, in a case that $n_{soll}>n_{ist}$, connecting a number $n_{soll}-n_{ist}$ of ORC modules that corresponds to the difference between the target number and the actual number, wherein the ORC modules with the longest remaining running times of ORC modules currently not being operated are connected; and
   wherein, in a case that $n_{soll}<n_{ist}$, disconnecting a number $n_{ist}-n_{soll}$ of ORC modules that corresponds to the difference between the actual number and the target number, wherein the ORC modules with the shortest remaining running times of ORC modules currently being operated are disconnected.

2. The method according to claim 1 comprising the further step of:
   re-performing the steps of claim 1 after a predetermined update period.

3. The method according to claim 1, wherein determining the running time remaining until the next servicing comprises determining the shortest running time for each operable ORC module from a plurality of running times remaining until the servicing times for various services for the respective ORC module.

4. The method according to claim 3, further comprising the step of:
   determining a variable that determines at least one selected from the group of a heat flow or a mass flow of a heat-conveying fluid in the ORC stack,
   wherein determining the target number of ORC modules to be operated is done in dependence of the variable determining the heat flow.

5. The method according to claim 4, comprising the further step of:
   re-determining the input heat flow after a predetermined waiting period after last determining the input heat flow has lapsed, and
   if a change of the input heat flow is determined beyond a tolerance range for the change, re-performing the method of claim 4 including all the steps in the respective dependent claims.

6. The method according to claim 4, wherein determining the target number of ORC modules to be operated further comprises determining a respective heat flow to be supplied within an operating range for each ORC module with respect to the heat flow supplied.

7. The method according to claim 5, wherein determining the target number of ORC modules to be operated further comprises determining a respective heat flow to be supplied within an operating range for each ORC module with respect to the heat flow supplied.

8. The method according to claim 6, wherein determining the heat flow to be supplied is effected within the operating range while taking into account the changes of the remaining running times resulting therefrom.

9. The method according to claim 7, wherein determining the heat flow to be supplied is effected within the operating range while taking into account the changes of the remaining running times resulting therefrom.

10. The method according to claim 1, further comprising the step of:
    determining a variable that determines at least one selected from the group of a heat flow or a mass flow of a heat-conveying fluid in the ORC stack,
    wherein determining the target number of ORC modules to be operated is done in dependence of the variable determining the heat flow.

11. The method according to claim 10, comprising the further step of:
    re-determining the input heat flow after a predetermined waiting period after last determining the input heat flow has lapsed, and if a change of the input heat flow is determined beyond a tolerance range for the change, re-performing the method of claim 10.

12. The method according to claim 10, wherein determining the target number of ORC modules to be operated further comprises determining a respective heat flow to be supplied within an operating range for each ORC module with respect to the heat flow supplied.

13. The method according to claim 12, wherein the operating range is defined for each ORC module by a heat flow range in an output curve or an efficiency curve indicating the relationship between electric power and electric efficiency in dependence of the heat flow supplied, wherein a heat flow range is defined by a minimum and a maximum heat flow.

14. The method according to claim 13, wherein the respective heat flow to be supplied is determined for one or more ORC modules to be operated such that the largest possible electrical power or the highest possible electrical efficiency results.

15. The method according to claim 13, wherein determining the heat flow to be supplied for each ORC module comprises maximizing overall electrical efficiency of the ORC stack.

16. The method according to claim 12, wherein determining the heat flow to be supplied is effected within the operating range while taking into account the changes of the remaining running times resulting therefrom.

17. The method according to claim 16, wherein the heat flow to be supplied is determined such that a shift of a servicing time by a desired period results, resulting in shortening or lengthening the respective remaining running time.

18. The method according to claim 1, wherein, in a case that $n_{soll}=n_{ist}$, and after a minimum running time of the ORC modules, the method comprises the further step of connecting the ORC module with a longest remaining running time $\Delta t_1$ of ORC modules not currently being operated, and disconnecting the ORC module with a shortest remaining running time $\Delta t_2$ of ORC modules currently being operated, if $\Delta t_1 > \Delta t_2$.

19. The method according to claim 1, wherein the respective servicing times for the operable ORC modules are servicing times for similar services.

20. An ORC stack with a total number $n_{tot}$ of individually operable ORC modules, wherein the ORC stack comprises a control unit for performing the method according to claim 1.

21. A computer program product for controlling an Organic Rankine Cycle (ORC) stack with a total number $n_{tot}$ of individually operable ORC modules, the computer program product comprising:

a non-transitory computer readable medium comprising code configured to:

determine the respective running time remaining until the next servicing time for each operable ORC module, wherein the respective running time remaining until the next servicing time is determined for one or more of the ORC modules based at least on a load and an operating time;

determine a target number $n_{soll}$ of ORC modules to be operated;

compare said target number $n_{soll}$ to an actual number $n_{ist}$ of currently operated ORC modules;

wherein, in a case that $n_{soll} > n_{ist}$, connect a number $n_{soll} - n_{ist}$ of ORC modules that corresponds to the difference between the target number and the actual number, wherein the ORC modules with the longest remaining running times of ORC modules currently not being operated are connected; and wherein, in a case that $n_{soll} < n_{ist}$, disconnect a number $n_{ist} - n_{soll}$ of ORC modules that corresponds to the difference between the actual number and the target number, wherein the ORC modules with the shortest remaining running times of ORC modules currently being operated are disconnected.

22. The computer program product according to claim 21, wherein in a case that $n_{soll}=n_{ist}$, and after a minimum running time of the ORC modules, the code is further configured to connect the ORC module with a longest remaining running time $\Delta t_1$ of ORC modules not currently being operated, and disconnect the ORC module with a shortest remaining running time $\Delta t_2$ of ORC modules currently being operated, if $\Delta t_1 > \Delta t_2$.

* * * * *